No. 888,594. PATENTED MAY 26, 1908.
O. W. DAVIS.
TRANSMISSION MECHANISM.
APPLICATION FILED AUG. 10, 1907.
3 SHEETS—SHEET 1.
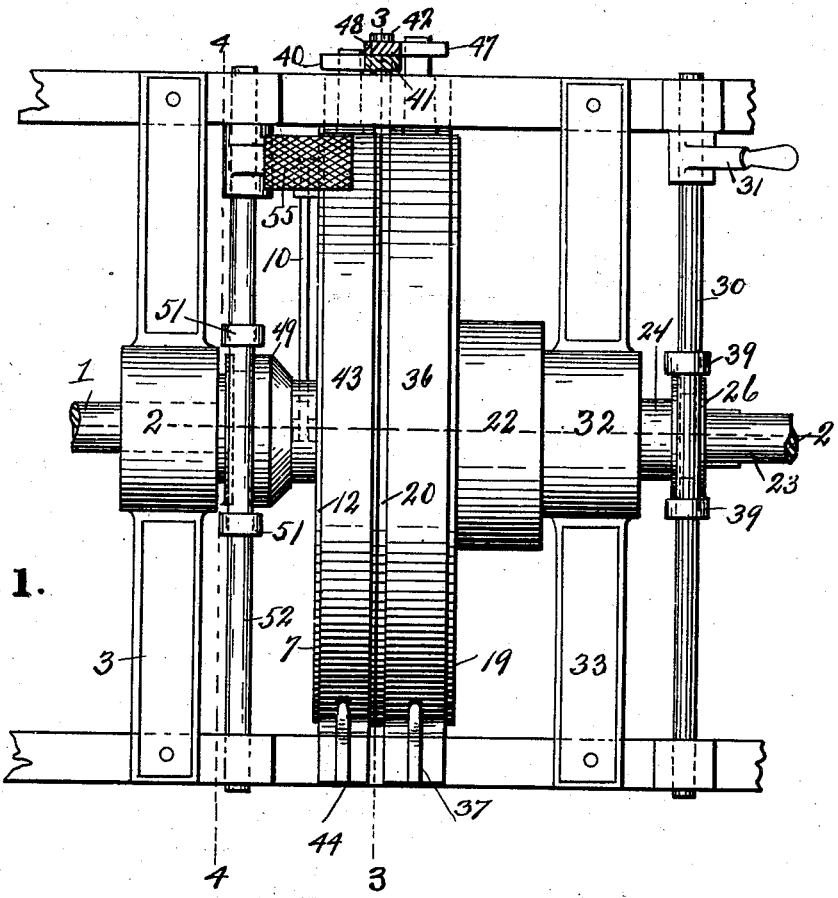
Fig. 1.
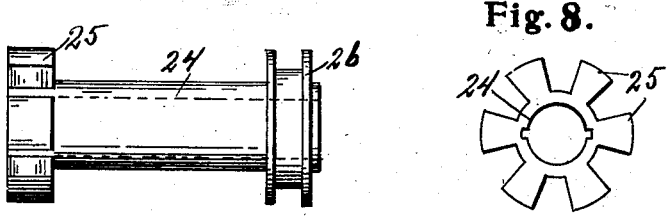
Fig. 7.
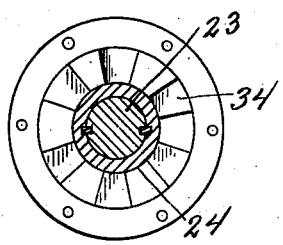
Fig. 8.
Fig. 10. Fig. 9.
Witnesses
O. B. Baenziger,
J. G. Howlett.
Inventor
Orson W. Davis.
By T. W. Wheeler & Co.
Attorneys No. 888,594.

PATENTED MAY 26, 1908.

O. W. DAVIS.
TRANSMISSION MECHANISM.
APPLICATION FILED AUG. 10, 1907.

3 SHEETS—SHEET 2.

Witnesses
O. B. Buenziger
J. G. Howlett

Inventor
Orson W. Davis

By T. J. Wheeler &Co.
Attorneys

No. 888,594. PATENTED MAY 26, 1908.
O. W. DAVIS.
TRANSMISSION MECHANISM.
APPLICATION FILED AUG. 10, 1907.

3 SHEETS—SHEET 3.

Witnesses
Inventor
Orson W. Davis.
By
Attorneys

UNITED STATES PATENT OFFICE.

ORSON W. DAVIS, OF ROCHESTER, NEW YORK, ASSIGNOR TO GEARLESS TRANSMISSION CO., OF ROCHESTER, NEW YORK, A CORPORATION OF NEW YORK.

TRANSMISSION MECHANISM.

No. 888,594.           Specification of Letters Patent.           Patented May 26, 1908.

Application filed August 10, 1907. Serial No. 387,974.

*To all whom it may concern:*

Be it known that I, ORSON W. DAVIS, a citizen of the United States, residing at Rochester, in the county of Monroe, State of New York, have invented certain new and useful Improvements in Transmission Mechanism; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to transmission gearing, especially adapted for use in connection with motor driven vehicles, and consists in the construction and arrangement of parts hereinafter more fully set forth and claimed.

The object of the invention is to produce a transmission gearing of the planetary type of simple, compact, and comparatively inexpensive construction, wherein the arrangement is such as to afford two speeds ahead, and one speed in reverse, and wherein the operative parts are readily under the control of the driver.

The above object is attained by the structure illustrated in the accompanying drawings, in which:—

Figure 2:
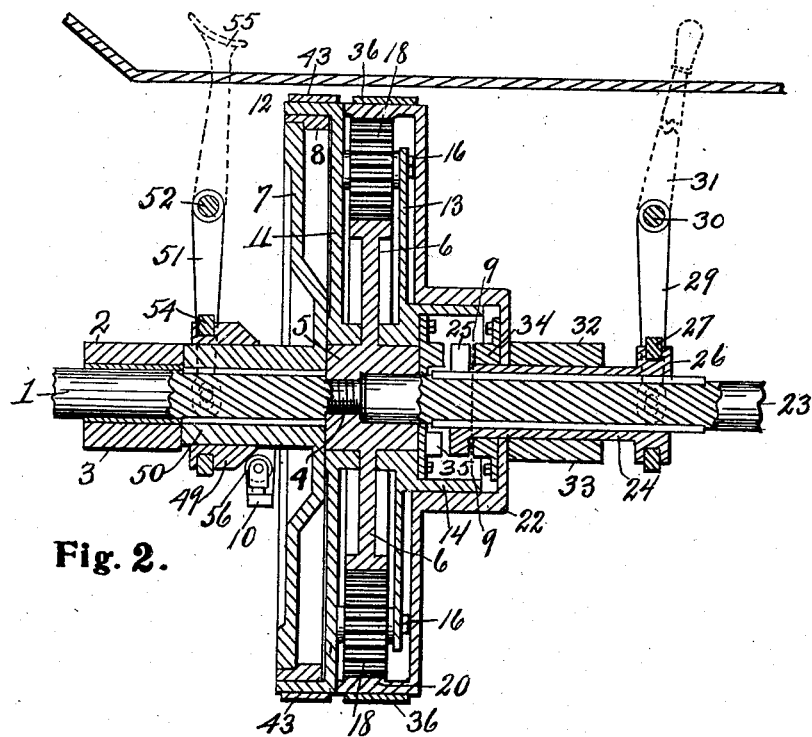
Figure 3:
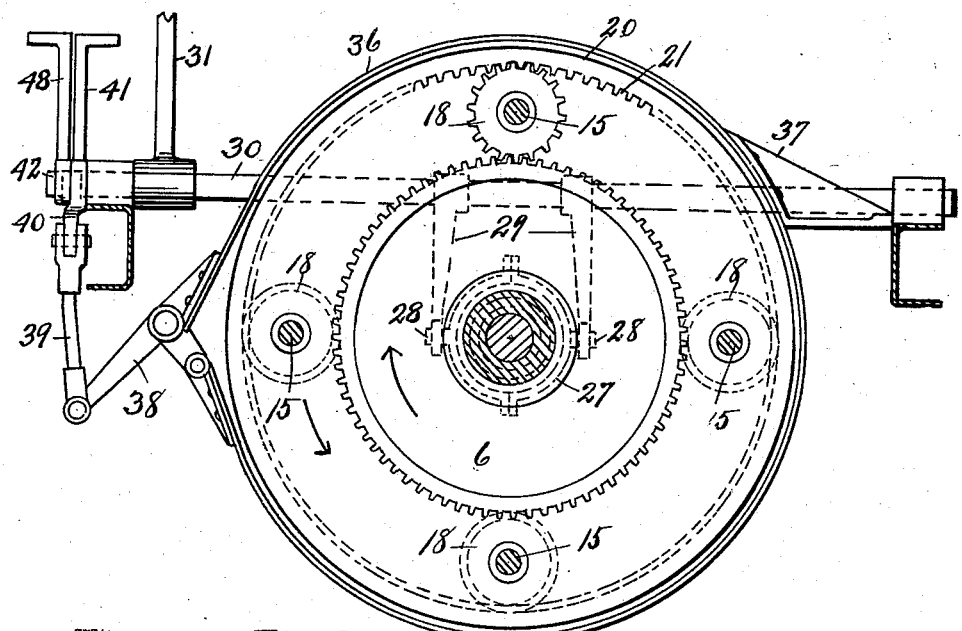
Figure 4:
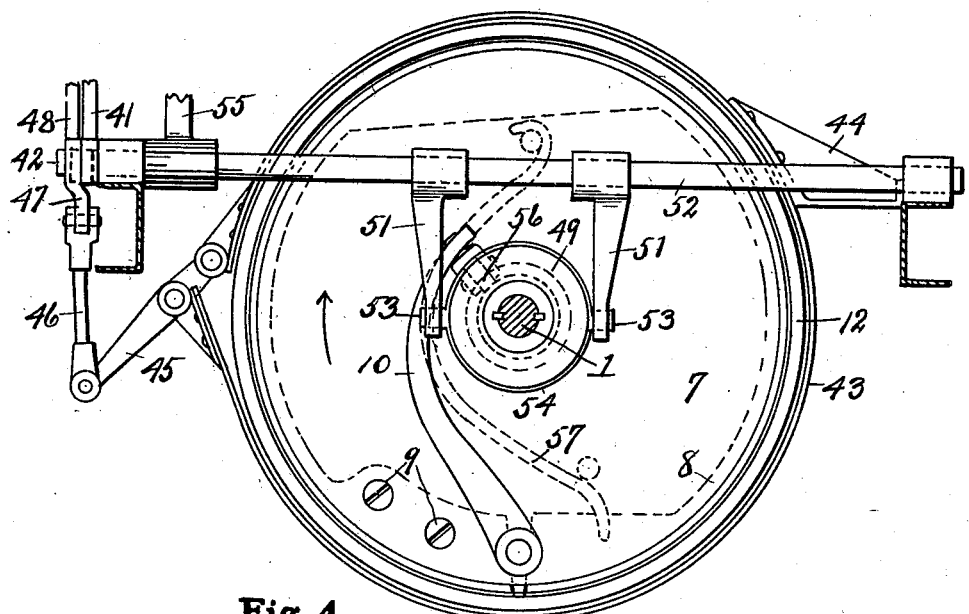
Figure 5:
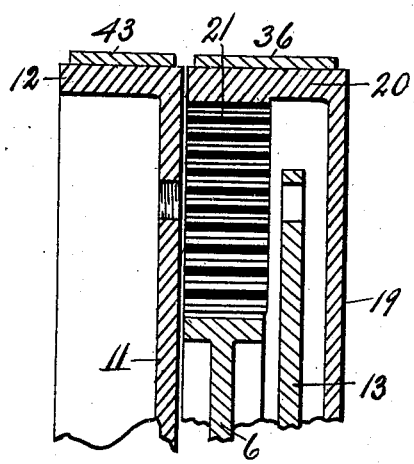
Figure 6:
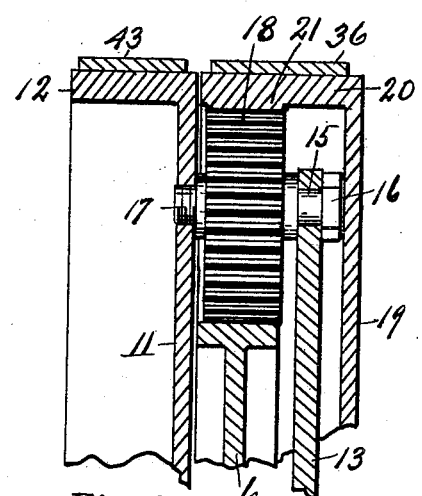

Figure 1 is a plan view of a transmission mechanism involving my invention. Fig. 2 is a central longitudinal section therethrough, as on line 2—2 of Fig. 1. Fig. 3 is a transverse section as on line 3—3 of Fig. 1. Fig. 4 is a similar section as on line 4—4 of Fig. 1. Fig. 5 is a fragmentary view in section, showing a portion of the main driving gear, the internal gear on the flange of the reversing disk, the direct drive clutch-driven disk and the indirect forward driving disk. Fig. 6 is a similar view showing one of the pinions which mesh with the main driving gear and with said internal gear, the stud of said pinion connecting the clutch driven disk with the forward indirect driving disk. Fig. 7 is an elevation of the sliding sleeve carrying the clutch members thereon. Fig. 8 is an end elevation thereof. Fig. 9 is a transverse section through the driven shaft and the slidable sleeve thereon, as on line 9—9 of Fig. 2. Fig. 10 is a fragmentary view in elevation of the pedals which operate the brake bands that embrace the flange of the disk driven by the direct drive or high speed clutch, and the flange of the reversing disk, respectively.

Referring to the characters of reference, 1 designates the motor or driving shaft journaled in suitable bearing 2 on the cross bar 3 of the frame. The inner end of the shaft 2 has a reduced threaded portion 4 which screws into the hub 5 of the main driving gear 6, whereby said gear becomes fixed to said shaft. Mounted upon the driving shaft and keyed thereto is a disk 7 which carries the expansible clutch ring 8 which is bolted, as at 9, (see Fig. 4) to the inner face of said disk and is adapted to be expanded in the ordinary manner by the curved lever 10.

Loosely mounted upon the hub of the main driving gear is a disk 11 having a laterally extending annular flange 12 which embraces the expansible clutch ring 8, and against the inner wall of which said ring is adapted to be expanded to lock the disk 11 to the disk 7 to cause said disks to turn in unison with the shaft 1. Also journaled upon the hub 5 of the main driving gear 6 on the end opposite to that on which the disk 11 is journaled, is a disk 13, the hub of which is provided with a laterally projecting annular flange 14.

Connecting the disks 11 and 13 near their perimeters are the studs 15 provided with a head 16. Said studs pass through the disk 13 and screw into the disk 11, as shown at 17 in Fig. 6. Journaled upon the studs 15 are the pinions 18 which mesh with the teeth of the main driving gear 6. Adjacent the disk 13 is the reversing disk 19 which is provided with a laterally extending circular flange 20 on the inner face of which are the gear teeth 21 which also mesh with the pinions 18. Said disk 19 has an extending hollow hub 22 which embraces the annular hub 14 of the disk 13 and rotates thereon.

The driven shaft 23 is embraced by a sleeve 24 which is splined thereon and which carries upon its inner end the clutch members 25. The outer end of the sleeve 24 has a channeled collar 26 in which is fitted a non-rotative ring 27 having the laterally projecting pins 28 adapted to be engaged by the slotted shifting arms 29 mounted on the transverse shaft 30 adapted to be actuated by the lever 31. The sleeve 24 is journaled in a suitable bearing 32 on the transverse bar 33 of the frame, said bar abutting against the closed end of the hub 22 of the disk 19, whereby said disk is maintained properly in place. The sleeve 24, as will be seen, passes through the end of said hub and is embraced thereby, while the inner end of the driven shaft enters and is journaled in the hub of the gear wheel 6. Secured to the inner face of the end of the hub 22 are the female clutch members 34, and secured to the face of the hub of the disk 13 within the annular flange 14 thereof are the female clutch members 35. By this arrangement the clutch members 34 of the reversing disk 19 and the clutch members 35 of the forward driving disk 13 are embraced within a housing formed by the annular hub flange 14 of the disk 13 and the embracing hollow hub of the disk 19, while the male clutch members 25 carried on the inner end of the sleeve 24 when in the neutral position, lie between the clutch members of said disks, as clearly shown in Fig. 2.

Embracing the flange 20 of the disk 29 is a brake band 36 supported by a bracket 37 attached to the frame and adapted to be contracted by the lever 38 pivoted at its outer end to a link 39 which is in turn pivoted to an arm 40 of the pedal 41 mounted on the stub shaft 42. Embracing the flange 12 of the disk 11 is a brake band 43 which is supported by a bracket 44 and is adapted to be contracted around said flange by means of the lever 45 pivoted to a link 46 which is in turn pivoted to an arm 47 of the pedal 48 also mounted on the stub shaft 42.

For the purpose of actuating the clutch lever 10 a conical collar 49 is mounted to slide upon the extended hub 50 of the disk 7 and is actuated by the arms 51 mounted on the rock shaft 52 and engaging with their lower ends the projecting pins 53 of the ring 54 lying in the channel of the collar 49. The shaft 52 is actuated by means of a pedal 55 to slide the conical collar upon the extended hub of the disk 7. When it is desired to expand the clutch ring 8 to lock the disk 7 to the disk 11, the collar 49 is moved so as to cause the conical face thereof to engage the anti-friction roller 56 carried by the end of the clutch lever 10, thereby actuating said lever to set the clutch. To contract the clutch ring for the purpose of releasing the clutch when pressure is removed from the pedal 55, a curved spring 57 is caused to engage the free end of said ring on the inner face of the disk 7, the opposite end of spring being secured to the inner face of said disk, as shown by dotted lines in Fig. 4.

With the parts in the position shown in Fig. 2, the clutch 25 on the sleeve 24 splined to the driven shaft, is in the neutral position, so that a rotation of the motor or driving shaft 1 will not impart movement to the driven shaft, the transmission members revolving idly with the driving shaft. The starting speed or slow speed ahead is afforded by setting the brake band 36 so as to prevent the rotation of the disk 19 and moving the clutch members 25 on the sleeve 24 into engagement with the clutch members 35 secured to the hub of the disk 13, when as shaft 1 revolves, the gear wheel 6 turning therewith will cause the pinions 18 to revolve and travel around upon the gear teeth 21 on the inner face of the flange 20 of said disk 19; said pinions being connected by their studs with the disk 13, said last-mentioned disk will be caused to revolve in the same direction as the gear wheel 6 but at a slower speed, and impart its motion to the sleeve 24 and to the shaft 23.

To reverse the driven shaft, the clutch members 25 on the sleeve 24 are carried into engagement with the clutch members 34 on the inner face of the hub of the disk 19, brake band 26 is released to permit the rotation of said disk and the brake band 43 is set to prevent the rotation of the disk 11, when as the shaft 1 revolves, the pinions 18 being held against traveling in a circle, are caused to revolve around their axis, thereby imparting a rotary motion to the disk 19 in a direction opposite to that of the gear wheel 6, which motion is transmitted to the shaft 23 through the clutch members 25 and 34.

When it is desired to drive the shaft 23 at the same rate of speed at which the shaft 1 is turning, or in other words to drive the shaft 23 at high speed, the clutch members 25 on the sleeve 24 are caused to engage the clutch members 35 on the hub of the disk 13 and the conical collar 49 is actuated to move the curved lever 10 to set the clutch ring 8 so as to lock the disk 7 to the disk 11. By this arrangement, the shaft 23 is driven from the shaft 1 through the disks 7 and 11, the studs of the pinions 18, the disk 13 and the clutch members 35 and 25. When the parts are so connected, both brake bands are released, allowing the parts to revolve with the shafts. To change from the high speed to the slow speed ahead, it is only necessary to release clutch ring 8 and set the brake band 36, when the shaft 23 will be driven as before described through the rotation of the pinions 18 in engagement with the gear teeth on the flange of the disk 19, causing a rotation of the disk 13 at a speed slower than the gear wheel 6, and imparting a corresponding speed to the shaft 23.

It will now be evident that this transmission mechanism is very simple and compact, and of such a construction as to readily afford the necessary speeds in both directions to enable the operator to properly manipulate a car to which it may be attached. It will further be evident that when driving at high speed all of the gears remain idle, thereby relieving them from wear.

Having thus fully set forth my invention, what I claim as new and desire to secure by Letters Patent, is:—

1. In a transmission mechanism, the combination of the motor and driven shafts journaled to rotate independently, a main driving gear fixed to the end of the motor shaft having a hub with extended ends, a pinion carrying frame spanning the ends of said shafts and having its ends loosely journaled on the ends of the hub of said gear, pinions journaled in said frame and meshing with the teeth of said driving gear, means for transmitting motion from said pinions to the driven shaft to reverse the motion thereof, means for locking one end of said pinion frame to the driven shaft, and means for locking the other end of said frame to the motor shaft.

2. In a transmission mechanism, the combination of the motor and driven shafts journaled to rotate independently, a main driving gear fast on the end of the motor shaft having a hub provided with extended ends, a pinion carrying frame spanning the ends of said shafts and having its ends loosely journaled on the extended ends of the hub of the driving gear, pinions journaled in said frame and meshing with the teeth of the driving gear, a reversing disk mounted to rotate independently of said shafts, said disk carrying gear teeth which mesh with said pinions, a clutch for locking the reversing disk to the driven shaft, means for locking one end of the pinion carrying frame to the driven shaft, means for locking the other end of said frame to the motor shaft, and means for restraining the rotation of the pinion carrying frame.

3. In a transmission mechanism, the combination of the motor and driven shafts journaled to rotate independently, a main driving gear fast on the end of the motor shaft having a hub provided with extended ends, a pinion carrying frame spanning the ends of said shafts and having its ends loosely journaled on the extended ends of the hub of the driving gear, pinions journaled in said frame and meshing with the teeth of the driving gear, a reversing disk mounted to rotate independently of said shafts, said disk carrying gear teeth which mesh with said pinions, a clutch for locking one end of the pinion carrying frame to the driven shaft, means for locking the other end of said frame to the motor shaft, means for restraining the rotation of the pinion carrying frame, and means for restraining the rotation of the reversing disk.

4. In a transmission mechanism, the combination of the motor and driven shafts journaled to rotate independently, a main driving gear fast on the end of the motor shaft having a hub provided with extended ends, a pinion carrying frame spanning said driving gear and journaled upon the extended ends of the hub thereof, pinions journaled in said frame meshing with said driving gear, a reversing disk journaled to rotate independently of said shafts having an over-hanging flange provided with gear teeth which mesh with said pinions, and having an extended hollow hub, clutch members within the hollow hub of the reversing disk for connecting said disk to the driven shaft and for connecting one end of the pinion carrying frame to said driven shaft, means for connecting the opposite end of the pinion frame to the motor shaft, means for restraining the pinion frame against rotation, and means for preventing the rotation of the reversing disk.

In testimony whereof, I sign this specification in the presence of two witnesses.

ORSON W. DAVIS.

Witnesses:
ANNA NOONE,
J. N. SAMPSON.